(12) United States Patent
Brelivet (10) Patent No.: US 10,701,118 B2
(45) Date of Patent: Jun. 30, 2020

(54) METHOD FOR THE PROCESSING OF A MULTIMEDIA STREAM, CORRESPONDING DEVICE AND COMPUTER PROGRAM

(71) Applicant: Orange, Paris (FR)

(72) Inventor: Herve Brelivet, Lannion (FR)

(73) Assignee: ORANGE, Paris (FR)

( * ) Notice: Subject to any disclaimer, the term of this patent is extended or adjusted under 35 U.S.C. 154(b) by 485 days.

(21) Appl. No.: 14/994,945

(22) Filed: Jan. 13, 2016

(65) Prior Publication Data
US 2016/0205156 A1    Jul. 14, 2016

(30) Foreign Application Priority Data

Jan. 13, 2015 (FR) ...................................... 15 50254

(51) Int. Cl.
*H04L 29/06* (2006.01)
*H04N 21/2343* (2011.01)
(Continued)

(52) U.S. Cl.
CPC .......... *H04L 65/4069* (2013.01); *A63F 13/86* (2014.09); *H04N 21/2343* (2013.01);
(Continued)

(58) Field of Classification Search
CPC .... H04L 65/4069; A63F 13/86; A63F 13/355; H04N 21/2343; H04N 21/632; H04N 21/64784; H04N 21/6582
See application file for complete search history.

(56) References Cited

U.S. PATENT DOCUMENTS 6,539,545 B1 * 3/2003 Dureau .............. H04N 7/17336
                                                        348/14.07
7,043,749 B1 * 5/2006 Davies .................... H04L 12/64
                                                        348/E7.084
(Continued)

FOREIGN PATENT DOCUMENTS

| EP | 1637197 A1 | 3/2006 |
|---|---|---|
| WO | 2009073796 A1 | 6/2009 |
| WO | 2014035645 A1 | 3/2014 |

OTHER PUBLICATIONS

French Search Report and Written Opinion dated Nov. 16, 2015 for French Application No. 1550254, filed Jan. 13, 2015.
(Continued)

*Primary Examiner* — Azizul Choudhury
(74) *Attorney, Agent, or Firm* — David D. Brush; Westman, Champlin & Koehler, P.A.

(57) ABSTRACT

A method is provided for processing multimedia streams between a platform for digital distribution of interactive applications and a customer terminal, connected through a communications network and communicating with each other according to a first communication protocol. The method includes the following acts implemented by an intermediate device distinct from the customer terminal: modifying a multimedia stream compliant with the first communication protocol, obtained from a multimedia stream transmitted from the platform for the digital distribution of interactive applications to the customer terminal, generating at least one modified multimedia stream compliant with at least one second communication protocol, the at least one second communication protocol being distinct from the first communication protocol, and transmitting the at least one modified multimedia stream to at least one rendering device using the at least one second communication protocol.

12 Claims, 4 Drawing Sheets

(51) Int. Cl.
*A63F 13/86* (2014.01)
*H04N 21/63* (2011.01)
*H04N 21/647* (2011.01)
*H04N 21/658* (2011.01)
*A63F 13/355* (2014.01)

(52) U.S. Cl.
CPC ..... H04N 21/632 (2013.01); H04N 21/64784 (2013.01); *A63F 13/355* (2014.09); *H04N 21/6582* (2013.01)

(56) References Cited

U.S. PATENT DOCUMENTS

| | | | |
|---|---|---|---|
| 7,649,898 B1* | 1/2010 | May, Jr. | H04M 7/0039 370/401 |
| 7,788,390 B2* | 8/2010 | Cardno | H04L 29/06 370/260 |
| 7,878,908 B2* | 2/2011 | Sloate | A63F 13/12 463/42 |
| 7,882,533 B2* | 2/2011 | Alao | H04L 65/4092 709/230 |
| 8,392,593 B1* | 3/2013 | Wadhwa | H04L 47/15 370/390 |
| 8,392,947 B2* | 3/2013 | Grannan | H04N 5/44591 725/131 |
| 8,996,690 B1* | 3/2015 | Pauley | H04L 63/102 340/506 |
| 9,021,134 B1* | 4/2015 | Patel | H04L 67/2823 709/246 |
| 9,268,517 B2* | 2/2016 | Privat | G06F 3/1423 |
| 9,774,921 B2* | 9/2017 | Yamagishi | H04N 21/6587 |
| 2002/0163911 A1 | 11/2002 | Wee et al. | |
| 2004/0013270 A1* | 1/2004 | Bae | H04N 21/2335 381/1 |
| 2004/0139233 A1 | 7/2004 | Kellerman et al. | |
| 2006/0047845 A1* | 3/2006 | Whited | H04L 29/06027 709/231 |
| 2007/0220165 A1* | 9/2007 | Moorer | H04L 65/4084 709/231 |
| 2007/0265094 A1* | 11/2007 | Tone | G07F 17/32 463/42 |
| 2008/0235733 A1* | 9/2008 | Heie | H04N 7/163 725/46 |
| 2008/0279216 A1* | 11/2008 | Sharif-Ahmadi | H04L 47/10 370/465 |
| 2010/0183004 A1* | 7/2010 | Kobayashi | G06F 13/385 370/389 |
| 2010/0185778 A1* | 7/2010 | Weigand | H04L 12/1877 709/231 |
| 2010/0272102 A1* | 10/2010 | Kobayashi | H04N 21/4305 370/389 |
| 2011/0010459 A1* | 1/2011 | Stokking | H04L 65/104 709/231 |
| 2011/0194026 A1* | 8/2011 | Reme | H04N 21/2541 348/466 |
| 2012/0017005 A1* | 1/2012 | Twitchell, Jr. | H04L 45/586 709/232 |
| 2012/0084356 A1* | 4/2012 | Ferdi | H04L 65/1016 709/204 |
| 2012/0084453 A1* | 4/2012 | Buser | H04N 21/2368 709/231 |
| 2013/0160044 A1* | 6/2013 | Mathews | H04N 21/23430 725/31 |
| 2013/0268986 A1* | 10/2013 | Venkatachalam | H04N 21/2365 725/109 |
| 2014/0094302 A1 | 4/2014 | Wilkiewicz et al. | |
| 2014/0098849 A1* | 4/2014 | Panich | G06F 3/1446 375/240.01 |
| 2014/0267570 A1* | 9/2014 | Weber | H04N 7/15 348/14.08 |
| 2015/0295955 A1* | 10/2015 | Cholkar | H04L 65/1066 709/204 |

OTHER PUBLICATIONS

English translation of the French Written Opinion dated Nov. 16, 2015 for French Application No. 1550254, filed Jan. 13, 2015.

* cited by examiner

METHOD FOR THE PROCESSING OF A MULTIMEDIA STREAM, CORRESPONDING DEVICE AND COMPUTER PROGRAM

CROSS-REFERENCE TO RELATED APPLICATIONS

This Application claims benefit of French Application No. 1550254, filed Jan. 13, 2015, which is incorporated by reference in its entirety in English.

1. FIELD OF THE INVENTION

The present invention pertains to the field of interactive applications such as online video games, and more particularly to a method for rendering the multimedia streams associated with such interactive applications, such as a user's video game sequences, on terminals distinct from the user's terminal.

Access to online interactive applications, such as a learning application or again online interactive game applications implement especially platforms for the digital distribution of interactive applications such as on-demand platforms for video games, also called digital game distribution platforms. Such platforms for the digital distribution of interactive applications enable the generation of renderings of learning sequences or video game sequences on service provider servers such as Internet access providers (IAP) and make it possible to deliver these renderings in the form of multimedia streams to a user, who is a customer of the platform, with low latency (almost in real time).

2. PRIOR ART

Up to the mid-2000s, the distribution of interactive applications such as video games and learning tools was done mainly in conventional form, using chains of stores specialized in the distribution of cultural products, brand names specializing specifically in interactive applications or large-scale distribution stores.

Then, impelled by public enthusiasm for the Internet and for online purchasing, certain trademarks have gone in for the online downloading of interactive applications such as attractive video games or interactive learning tools.

The digital distribution of interactive applications has now become a permanent feature of the video game scene and is gaining wide popularity especially with platforms such as Sony Playstation Now® enabling users to test a video game by using a continuous streaming mode without downloading, OnLive® which is a game system making use of infrastructures known as "cloud computing" (in which the computation power and/or storage capacity of remote servers is used through a network, generally the Internet, or again Orange Game on Demand® proposed by the Orange® Internet access provider.

Such platforms for the digital distribution of interactive applications such as games therefore deliver multimedia streams on request from users who have access thereto. To distribute these streams, communication protocols specific to each games-on-demand platform are implemented.

Implementing of such specific protocol layers takes up a substantial share of the bandwidth of the Internet connection of the platform for the digital distribution of interactive applications to the customer user of this platform.

In order to share their gaming experience, players who play games or are in a learning session in their home environment could wish to make live broadcasts of their gaming or learning sequences towards the terminals of other users or again towards other platforms of specialized services such as Twitch®, UStream® or again Dailymotion®.

However, such broadcasts from a user towards external rendering devices or platforms consume a great deal of the bandwidth of an Internet link known as the uplink between the user (the customer of the games-on-demand platform) and his access provider, a link which moreover can be disturbed by concurrent use of this same link.

In addition, at present, it must be noted that the protocols used by the terminals of other users, or again by other specialized service platforms such as Twitch®, UStream® or again Dailymotion® differ from the specific protocols implemented by platforms for the digital distribution of interactive applications such as games-on-demand platforms or are even incompatible in terms of bit rate owing to the technical limitations of the user's terminal.

A user can try and carry out a protocol adaptation but this would be at the cost of performing a complex processing operation that is time-consuming (not compatible with the desired real-time broadcasting), and costly in terms of the resources required. This proves to be contrary to the very use of a platform for the on-demand distribution of interactive applications that meets the needs of users whose equipment is often limited in terms of power.

Furthermore, even when the user can overcome these difficulties, the user's Internet connection currently does not enable, on the one hand, the accurate transmission of a first multimedia stream from the platform for the digital distribution of interactive applications to the user and, on the other hand, the broadcasting of a second multimedia stream corresponding to sequences of execution of the user's interactive applications (here below known as interactive sequences) towards external rendering devices (such as the terminals of other users, or again by other specialized service platforms such as Twitch®, UStream® or again Dailymotion®). Indeed, these two types of multimedia streams would be competing to share the bandwidth of the user's Internet connection, and this would lead to a deterioration in their rendering quality.

Thus, there is therefore a need to provide a solution that can provide for a broadcasting of multimedia streams, corresponding to sequences of interactive applications (here below known as interactive sequences) from the user to external rendering devices while at the same time maintaining efficient access by the user to his network.

3. SUMMARY OF THE INVENTION

The invention proposes a novel solution to the alternative distribution of multimedia streams towards rendering devices while at the same time maintaining efficient access by the user to his network.

More specifically, the invention proposes a method for the processing of multimedia streams between a platform for the digital distribution of interactive applications and a customer terminal, connected through a communications network and communicating with each other according to a first communication protocol, comprising the following steps implemented by an intermediate device distinct from the customer terminal:

modifying a multimedia stream compliant with the first communication protocol, obtained from a multimedia stream transmitted from the platform for the digital distribution of interactive applications to the customer terminal, generating at least one modified multimedia stream compliant with at least one second communication protocol, said at least one second communication protocol being distinct from said first communication protocol, transmitting said at least one modified multimedia stream to at least one rendering device in using said at least one second communication protocol.

The invention thus proposes to improve the techniques for rendering multimedia streams, corresponding to the user's sequences of interactive applications, to rendering devices.

Indeed, the invention proposes to preserve the bandwidth of the user's Internet connection by "capturing" through an intermediate device, a multimedia stream representing the multimedia stream transmitted by the platform for the digital distribution of interactive applications (for example a games-on-demand platform) to the customer terminal, this multimedia stream being compliant with a first communication protocol governing exchanges between these two entities.

Once captured, this multimedia stream is processed independently by the intermediate device so as to be modified to produce a modified multimedia stream compatible with a second communication protocol required by the rendering device targeted by the user, this second communication protocol being distinct from the first communication protocol implemented between the platform for the digital distribution of interactive applications and the customer terminal.

The present invention therefore enables the broadcasting of interactive sequences, for example a user's games or learning sequences, to be displaced, this broadcasting being done by the intermediate device according to the invention and not by the user's customer terminal, thus preserving the bandwidth of the user's Internet link since this Internet link is not used to broadcast the user's interactive sequences to other rendering devices.

Thus, the classic exchanges between the platform for the digital distribution of interactive applications and the customer terminal remain unchanged and compliant with a first communication protocol while the intermediate devices according to the invention broadcasts the user's interactive sequences independently and almost in real time (a slight delay being caused by the step of modification of the multimedia stream received so as to make it compliant with the communication protocols implemented by the target rendering devices) to rendering devices requiring second communication protocols distinct from the first communication protocol.

It must be noted that the term "rendering devices" is understood to mean devices that can correspond to devices distinct, equally well from the platform for the digital distribution of interactive applications, the customer terminal and the intermediate device implementing the method according to the invention. For example, they may be other users' terminals or specialized service platforms such as Twitch, UStream or Dailymotion proposing rendering according to a predetermined communication protocol that is distinct from the communication protocol used specifically between the platform for the digital distribution of interactive applications, for example a games-on-demand platform, and the customer terminal.

Such rendering devices can also correspond to the customer terminal if the customer wishes for example to broadcast his game sequence on two distinct graphic windows by respectively using two distinct communication protocols. These two graphic windows can for example correspond to the case of a screen connected by a dvi cable to another rendering device also provided with a screen, for example a portable computer.

According to one particular characteristic of the invention, the method of processing comprises a step of duplication, by the platform for the digital distribution of interactive applications, of said multimedia stream transmitted to the customer terminal, delivering said multimedia stream compliant with the first communication protocol, called a duplicated multimedia stream, said duplicated multimedia stream being transmitted from the platform for the digital distribution of interactive applications to the intermediate device.

Thus, according to this particular case, the platform for the digital distribution of interactive applications classically sends the customer terminal the multimedia stream that is intended for it and also sends a copy of this multimedia stream, called a duplicated multimedia stream, to the intermediate device referred to here above.

In other words, according to this particular characteristic, the platform for the digital distribution of interactive applications transmits two identical multimedia streams, compliant with the first communication protocol used for communications between the platform for the digital distribution of interactive applications and the customer terminal, these two multimedia streams being respectively intended for the customer terminal on the one hand and the intermediate device on the other hand.

According to another particular characteristic of the invention, the processing method comprises a step of duplication, by the intermediate device, of the multimedia stream transmitted to the customer terminal, delivering said multimedia stream compliant with the first communication protocol, called a duplicated multimedia stream, the multimedia stream being received by the intermediate device coming from the platform for the digital distribution of interactive applications and then being re-transmitted to the customer terminal.

Thus, in this case which is an alternative to the previous case, the intermediate device receives the multimedia stream intended for the customer terminal, duplicates it in order to process the multimedia stream resulting from the duplication, called a duplicated multimedia stream, and re-transmits the received stream to the customer terminal.

In other words, the intermediate device intercepts the multimedia stream transmitted by the platform for the digital distribution of interactive applications to the customer terminal, duplicates it and then re-sends it to the customer terminal.

According to one optional characteristic of the invention, the method of processing comprises a preliminary step for receiving a piece of information representing an authorization of duplication of said multimedia stream transmitted to the customer terminal, sent by an entity belonging to the group comprising:

said customer terminal,
said platform for the digital distribution of interactive applications,
a provider of access to said communications network.

Indeed, the customer user chooses or does not choose to use this alternative method of broadcasting to other rendering devices. To indicate this choice, the customer terminal sends its consent directly to the intermediate device or to a platform for the digital distribution of interactive applications which then forwards this consent to the intermediate device, or subscribes to a service with his access provider so that this access provider authorizes the duplication of the multimedia stream pertaining to his game sequences by the platform for the digital distribution of interactive applications or by the intermediate device.

According to one particular characteristic of the invention, said step for modifying comprises at least one step for memorizing a piece of information representing said at least one second communication protocol.

Indeed, according to a first alternative, the communication protocol or protocols required by the rendering devices are known by default to the intermediate device implementing the present invention, for example if the customer user should wish to render his interactive sequences each time on the same rendering device or platform.

However, according to the embodiment pertaining to this particular characteristic of the invention, the customer user or the target rendering device (or devices) can have exchanges with the intermediate device according to the invention in order to inform it dynamically about the communication protocol that it must take into account to adapt the multimedia streams that it receives in order to re-transmit one or more multimedia streams each compatible with the target rendering device (or devices).

To this end, the intermediate device according to the invention receives and memorizes, in this case for example, an identifier of the communication protocol used by this rendering device. According to another example, the intermediate device according to the invention receives and memorizes a piece of information identifying the target rendering device and, in the light of its nature, deduces therefrom the communication protocol used by this target rendering device that it must take into account to modify the multimedia stream that it has "captured" between the platform for the digital distribution of interactive applications and the customer terminal.

According to one particular characteristic of the invention, said step for modifying comprises a step for de-encapsulating said multimedia stream compliant with the first communication protocol delivering de-encapsulated data packets and a step of encapsulating according to said at least one second communication protocol, said at least one modified multimedia stream being generated from said encapsulation (136) of said de-encapsulated data packets.

Encapsulation in computer science, and specifically for computer networks, is a method for including the data of a protocol in another protocol.

For example, the Internet is based on the Internet protocol (IP) version 4 and most of the applications use the UDP (User Datagram Protocol) as well as the TCP (Transmission Control Protocol). Thus, a data fragment is encapsulated in a UDP datagram which itself is encapsulated in an IP packet, this IP packet being then sent through a protocol of the link layer (for example the Ethernet). The link layer is responsible for the physical transmission of data. The Internet Protocol adds the addressing of the individual computers, the UDP adds the addressing of the applications (i.e. the port specifying the service such as for example a web service or a TFTP server).

The de-encapsulation therefore consists in extracting the pieces of data known as basic data, which had been encapsulated by using the first protocol implemented between the platform for digital distribution of interactive applications and the customer terminal.

Thus, within the multimedia stream captured by the intermediate device between the platform for the digital distribution of interactive applications and the customer terminal, this intermediate device selects the data that it will modify, thus limiting the complexity and duration of the modification that it implements.

According to one particular characteristic of the invention, said step for modifying furthermore comprises a step of decoding packets of de-encapsulated data according to a first packet-encoding format, delivering decoded data, and a step of encoding said decoded data, according to a second encoding format distinct from the first encoding format, delivering encoded data intended to be encapsulated during said encapsulation step.

In particular, said step for modifying furthermore comprises a selection of the at least one encoding parameter to be applied during said encoding of the decoded data, said at least one encoding parameter belonging to the group of the following parameters:

encoding format,
resolution applied to said video data,
bit rate.

For example, for video data, the encoding format corresponds for example to an encoding according to the H.264 standard, the resolution corresponds to resolutions of 320×240 pixels, 480×360 pixels, 720×483 pixels, 1280×720 pixels, 1920×1080 pixels, and the bit rates correspond for example to bit rates of 500 kbps, 800 kbps, 1200 kbps, 2500 kbps and 3500 kbps.

For example, for audio data, the encoding format corresponds for example to the MP3 or AAC encodings, the bit rate corresponds for example to the 128 or 160 kbps bit rates.

According to one optional characteristic of the invention, said step for modifying furthermore comprises a step for the de-multiplexing of de-encapsulated data delivering de-multiplexed data to be decoded during the decoding step and/or a step of multiplexing of the data encoded according to the second encoding format delivering the multiplexed data that is to be encapsulated during the encapsulation step.

Such de-multiplexing enables an independent adaptation of the audio and video data in order to generate a modified multimedia stream compatible both from the audio viewpoint and from the video viewpoint with the target rendering device.

According to another aspect, the proposed technique also relates to an intermediate device for processing multimedia streams capable of being used between a platform for the digital distribution of interactive applications and a customer terminal connected through a communications network, the intermediate device and the customer terminal communicating with each other according to a first communication protocol, said intermediate device comprising:

a module for modifying a multimedia stream compliant with the first communication protocol, obtained from a multimedia stream transmitted from the platform for the digital distribution of interactive applications to the customer terminal, generating at least one modified multimedia stream compliant with at least one second communication protocol, said at least one second communication protocol being distinct from said first communication protocol, a module for transmitting said at least one modified multimedia stream to at least one rendering device in using said at least one second communication protocol.

Such an intermediate device acts as a "relay" for the user's interactive sequences in order to broadcast them on a channel of its own (between itself and one of the target rendering devices and is especially adapted to implementing the method for processing multimedia streams described here above.

According to one particular characteristic, the intermediate device for processing multimedia streams according to the invention furthermore comprises a duplication module for duplicating the multimedia stream transmitted to the customer terminal, delivering said multimedia stream compliant with the first communication protocol, called a duplicated multimedia stream, said duplication module receiving said multimedia stream transmitted to the customer terminal by said platform for the digital distribution of interactive applications, and re-transmitting, after duplication, said multimedia streams to said customer terminal.

This intermediate device could of course also comprise the other different characteristics pertaining to the method for processing multimedia streams according to the invention, which can be combined or taken in isolation. Thus, the characteristics and advantages of this device are the same as those of the method for processing multimedia streams. As a consequence, they are not described in fuller detail.

According to another aspect, the proposed invention also pertains to a system for processing multimedia streams comprising a platform for the digital distribution of interactive applications and a customer terminal, connected through a communications network and communicating with each other according to a first communication protocol, said platform for the digital distribution of interactive applications transmitting a multimedia stream compliant with said first protocol to said customer terminal, said system comprising an intermediate device as described here above, and the platform for the digital distribution of interactive applications comprising a duplication module for duplicating said multimedia stream transmitted by said platform to the customer terminal, delivering a multimedia stream compliant with the first communication protocol and intended to be transmitted to said intermediate device.

According to a preferred implementation, the different steps of the method for processing multimedia streams according to the invention are implemented by one or more software or computer programs comprising software instructions to be executed by a data processor of an intermediate device according to the invention and being designed to command the execution of the different steps of the method.

As a consequence, the invention is also aimed at providing a program, capable of being executed by a computer or by a data processor, this program comprising instructions to command the execution of the steps of a method for processing multimedia streams as mentioned here above.

This program can use any programming language whatsoever and can be in the form of a source code, object code or intermediate code between source code and object code, such as in a partially compiled form or in any other desirable form.

The proposed technique is also aimed at providing an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM (USB key, SSD) or again a magnetic recording means, for example a floppy disk or a hard disk drive.

Again, the information carrier can be a transmissible carrier such as an electrical or optical signal, which can be conveyed via an electrical or optical cable, by a radio or by other means. The program according to the proposed technique can be especially uploaded to an Internet type network.

As an alternative, the information carrier can be an integrated circuit into which the program is incorporated, the circuit being adapted to execute or to be used in the execution of the method in question.

According to one embodiment, the proposed technique is implemented by means of software and/or hardware components. In this respect, the term "module" can correspond in this document equally well to a software component and to a hardware component or to a set of hardware and software components A software component corresponds to one or more computer programs, one or more sub-programs of a program or more generally to any element of a program or a piece of software capable of implementing a function or a set of functions as described here above for the module concerned. Such a software component is executed by a data processor of a physical entity (terminal, server, gateway, router, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the proposed technique.

4. LIST OF FIGURES

Other features and advantages of the proposed technique shall appear more clearly from the following description of a preferred embodiment, given by way of a simple illustrative and non-exhaustive example and from the appended drawings, of which.

DESCRIPTION OF ONE EMBODIMENT OF THE INVENTION 5.1 General Principle

The general principle of the invention relies on the use of an intermediate device between the platform for the digital distribution of interactive applications (for example a games-on-demand platform) and a user terminal (called a customer terminal) used to modify interactive sequences of a user, received within the intermediate device according to a first communication protocol proper to the exchanges between the platform for the digital distribution of interactive applications and the user terminal, and then directing them on a particular communications path between this intermediate device and at least one rendering device requiring a second communication protocol distinct from the first communication protocol.

In other words, the proposed solution is based on a system that duplicates the multimedia streams coming from the platforms for the digital distribution of interactive applications, adapts them in terms of protocols and broadcasts them towards specialized service platforms or other rendering devices/modules requiring a second communication protocol.

Figure 1:
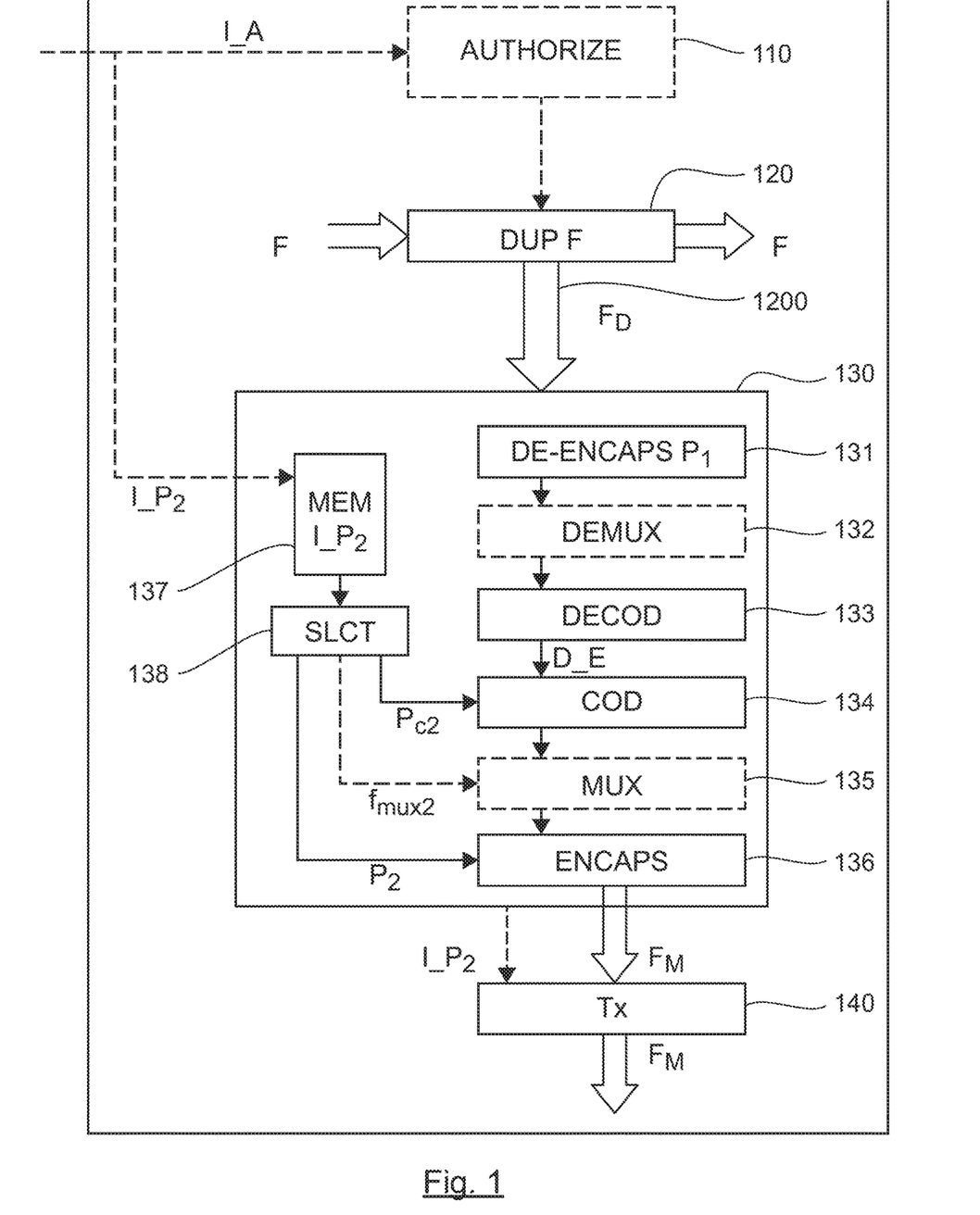
FIG. 1 presents the main steps implemented by a method for the processing of multimedia streams according to one embodiment of the invention.

Referring to FIG. 1, we present first of all the main steps carried out by an intermediate device 10 between a platform for the digital distribution of interactive applications 20 and a customer terminal 30, as represented with reference to FIGS. 3 and 4 described here below, to transmit a user's interactive sequences to one or more rendering devices (among the rendering devices 51 to 55 represented in FIG. 3). Such interactive sequences are transmitted by the intermediate device 10 according to a communication protocol, required by the rendering device and distinct from the communication protocol governing exchanges between the platform for the digital distribution of interactive applications 20 and the customer terminal 30.

To this end, the intermediate device 10 (step 1200) first of all obtains a multimedia stream $F_D$ compliant with a first communication protocol $P_1$ proper to the exchanges between the platform for the digital distribution of interactive applications 20 and the customer terminal 30.

In particular, the multimedia stream $F_D$ is obtained by duplication (step 120) of the multimedia stream F transmitted in real time from the platform for the digital distribution of interactive applications 20 to the customer terminal 30.

Such platforms for the digital distribution of interactive applications enable the generation of renderings of learning sequences or video game sequences following an action by the user (for example the entry of a response, a movement of a character in a game or an avatar via a motion of a pointer corresponding for example to a computer mouse, etc.) on servers of a service provider such as an Internet access provider (IAP) and the delivery of these renderings with low latency (almost in real time) to a user, a customer of the platform, in the form of multimedia streams by using the user's Internet connection 40. In other words, the intermediate device "captures" an image (i.e. a copy) of the multimedia stream, which is sent from the platform for the digital distribution of interactive applications 20 to the customer terminal 30.

As illustrated here below with reference to FIGS. 3 and 4, such a duplication step is performed either by a duplication module 220 of the platform for the digital distribution of interactive applications 20 (cf. FIG. 3) or by a duplication module 440 of the intermediate device 10 (cf. FIG. 4) and delivers a multimedia stream $F_D$, called a delivered multimedia stream, compliant with the first communication protocol $P_1$.

Such a duplication (step 120) is permitted by default or optionally (shown in dashes) preliminarily by the user of the customer terminal 30 which sends out a request for the broadcasting of its interactive sequences by means of the intermediate device 10 according to the invention.

To this end, when such a broadcasting is not authorized by default, the intermediate device 10 implements a preliminary optional step (shown in dashes) for receiving (step 110) a piece of information I_A representing an authorization to receive a multimedia stream, this request being sent out by an entity belonging to the group comprising:
said customer terminal,
said platform for the digital distribution of interactive applications,
a provider of access to said communications network.

In particular, said piece of information representing authorization to receive corresponds for example to:
an identifier (for example an IP address) specifically allocated to said intermediate device 10 in said communications network (in other words, in this case, the intermediate device 10 is visible in the network), or
an authorization of virtual use of an identifier (for example an IP address) allocated to the customer's terminal 30 (in this case, the intermediate device 10 is "transparent" in the network like a virtual machine dedicated to the alternative broadcasting of the user's interactive sequences to other rendering devices).

Once a duplicated multimedia stream $F_D$ is obtained by the intermediate device 10, this duplicated multimedia stream $F_D$ can be stored temporarily in a memory 41 of the intermediate device, as illustrated further below with reference to FIG. 5, in order to be modified (step 130).

Indeed, the duplicated multimedia stream $F_D$ is compliant with a first communication protocol $P_1$ governing exchanges between the platform for the digital distribution of interactive applications 20 and the customer terminal 30. Such a protocol $P_1$ is for example a UDP protocol, or a protocol sequence where the pieces of exchanged data are encapsulated by means of the UDP protocol at the transportation layer, so that an encapsulating step is thus performed.

Such an encapsulation implemented by the platform for the digital distribution of interactive applications 20 consists in processing data D_E to be transmitted, possibly encoded or multiplexed beforehand.

In particular, these pieces of data are processed according to a protocol transportation layer delivering a fragment of pieces of data, called pieces of data D_UDP encapsulated in a datagram UDP furthermore comprising a UDP header.

The modification of the duplicated stream $F_D$ then comprises a step of de-encapsulation (step 231) in which the data packets (encoded and/or multiplexed) that were hitherto encapsulated are extracted by using the first protocol $P_1$ implemented between the platform for the digital distribution of interactive applications and the customer terminal.

Once these pieces of data are obtained, the step of modification (130) can optionally (especially when a multiplexing has been implemented by the platform for the digital distribution of interactive applications 20) implement a de-multiplexing (step 132) delivering de-multiplexed video and/or audio data that can be processed independently in order to deliver a modified multimedia stream $F_M$ compliant with the needs of the rendering device that has been identified by the user of the customer terminal 30.

After the optional de-multiplexing (step 132), the modification step (130) comprises a step (133) for decoding de-encapsulated data packets according to a first encoding format $f_{c1}$, delivering decoded data D_E.

In parallel, a piece of information I_$P_2$ representing a second communication protocol $P_2$ required by the rendering device identified by the user of the customer terminal 30 is stored (step 137) in the memory 41 when the intermediate device 10 does not have one by default.

Such a piece of information I_$P_2$ can correspond to the identifier of this second protocol $P_2$ as such. Such a piece of information I_$P_2$ can also correspond to the identifier of the rendering device designated by the user of the customer terminal 30.

According to a first alternative embodiment, it is possible that the intermediate device 10 has a table or file available, within the memory 41, to determine the communication protocol required by the rendering device corresponding to this identifier, this communication protocol being then taken into account during the steps of encoding (134), optionally multiplexing (135) and encapsulation (136) of the modification step 130 to adapt the duplicated multimedia stream $F_D$ so as to make it compatible with the second communication protocol ($P_2$) of the rendering device required by the user.

It is especially possible that such a piece of information I_$P_2$ representing the second communication protocol will be received jointly with the information I_A representing an authorization to duplicate the multimedia stream received by said intermediate device.

It must be noted that the present invention can advantageously enable the re-broadcasting of the user's interactive sequences from the intermediate device to several distinct rendering devices, and that in this case for each rendering device identified by the user, the intermediate device memorizes (step 137) as many pieces of information representing communication protocols as there are rendering devices designated by the user.

On the basis of this piece of information I_$P_2$ representing the second communication protocol $P_2$, the modification step 130 furthermore comprises a selection (step 138) for selecting at least one encoding parameter $P_{c2}$ to be applied during the decoding (134) of the decoded data D_E, said at least one encoding parameter belonging to the following group of parameters:

encoding format $f_{c2}$ (MPEG, AAC, MP3), resolution applied to said video data, bit rate.

The selection (step 138) of the encoding parameter Pc can be dynamic (i.e. it can vary according to time and the rendering needs of the user of the customer terminal 30). The intermediate device is therefore reconfigurable because it is capable of adapting the modification applied to the duplicated stream $F_D$.

For example, at certain times of the day, the customer user may wish to broadcast his own interactive sequences on a platform of specialized services such as Twitch®, UStream® or again Dailymotion®, using the RTMP protocol ("Real Time Messaging Protocol") (or RTMPT ("Real Time Messaging Protocol Tunneled") where the RTMP data elements are moreover encapsulated by using the http ("Hypertext Transfer Protocol) which itself works by using the TCP ("Transmission Control Protocol").

Then, at other times of the day, corresponding for example to the times of presence at home of the user's friends, or of members of an interactive community in which the user is participating, the customer user may wish to broadcast his own interactive sequences directly on the rendering devices of these individuals by preferring to use the HLS ("Http Live Streaming") protocol.

Taking account of such encoding parameters $P_{c2}$ during the encoding (134) of the data D_E results in the delivery of encoded data. These pieces of encoded data are optionally multiplexed (step 135) in taking account of a multiplexing format $f_{mux2}$, for example MPEG2-TS and selected (step 138) on the basis of the information I_$P_2$ representing the second communication protocol.

Then, these pieces of encoded (or even multiplexed) data are encapsulated (step 136) in compliance with the second communication protocol $P_2$.

Figure 2:
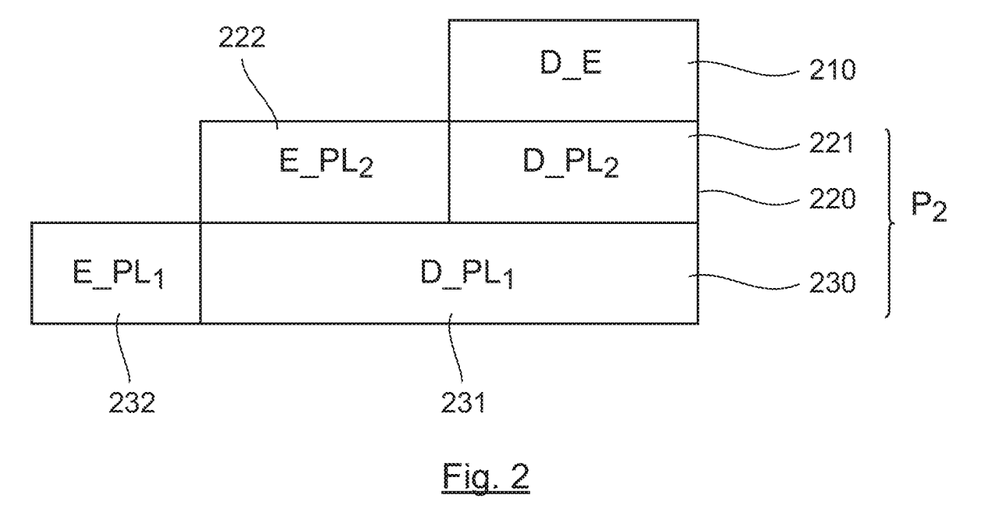
FIG. 2 illustrates an example of encapsulation implemented by the first communication protocol.

FIG. 2 more particularly illustrates an example of encapsulation (136) implemented according to the invention.

In this example, the encapsulation of the data in the second protocol $P_2$ comprises two levels of encapsulation (or protocol layers) $PL_1$ and $PL_2$.

The pieces of data D_E 210 to be transmitted by the intermediate device 10, possibly encoded (step 134) and multiplexed (step 135) beforehand, are therefore first of all encapsulated according to a first application protocol layer (220) $PL_2$ (i.e. at the application layer, for example a proprietary protocol of the platform 20 or the "http live streaming" or again RTMPT protocols) delivering a fragment of pieces of data D_$PL_2$ (221), and a header E_$PL_2$ 222.

Then, the product (220) of this first encapsulation is itself encapsulated according to a second transportation protocol layer (230) (for example TCP) delivering a fragment of pieces of data, called pieces of data D_$PL_1$ (231) and a header E_$PL_1$ (232).

At the end of the encapsulation (136), the modification step (130) delivers a modified multimedia stream $F_M$ compatible with the second communication protocol $P_2$ implemented by the rendering device identified by the user of the customer terminal 30 by means of the piece of representative information I_$P_2$.

Such a modified multimedia stream $F_M$ is then transmitted (step 140) by the intermediate device 10 to the rendering device or devices identified by the user. In particular, when said rendering devices are identified by the user of the customer terminal 30, the intermediate device 10 can use encoding parameters and communication protocols specific to each rendering device during the modification of the duplicated stream $F_M$ before the respective modified multimedia streams $F_{M1}$, $F_{M2}$, etc., obtained at the end of this step of modification, are transmitted towards these different rendering devices.

It must be noted that the transmission module 45 of the intermediate device 10, as illustrated further below with reference to FIG. 5, uses the piece of information I_$P_2$ representing the second protocol $P_2$ previously memorized (step 137), when such information is not available by default.

The tables here below illustrate an example of parameters for encoding the duplicated multimedia stream $F_D$ as compared with the parameters for encoding the modified multimedia stream $F_M$ delivered by the intermediate device 10 (herein with a same video encoding format, but a resolution and a bit rate that vary according to the rendering device considered):

Characteristics of the multimedia stream received $F_R$ before processing by the device 10

| | Video: MPEG2 encoding | | Audio: MP3 encoding |
|---|---|---|---|
| | Standard definition SD | High definition HD | |
| Resolution (pixels) | 768 × 576 | 1920 × 1080 | N/A |
| Bit rate (kbps) | 2900 | 11000 | 192 |

| Characteristics of the multimedia stream received $F_M$ after processing by the device 10 | | | | | | | |
|---|---|---|---|---|---|---|---|
| | Video: H.264 encoding | | | | | Audio MP3 | Audio AAC |
| Profile | D_R_1 | D_R_2 | D_R_3 | D_R_4 | D_R_5 | coding | Coding |
| Resolution (pixels) | 320 × 240 | 480 × 360 | 720 × 480 | 1280 × 720 | 1920 × 1080 | N/A | N/A |
| Bit rate (kbps) | 500 | 800 | 1200 | 2500 | 3500 | 128 | 160 |

5.2 Detailed Example of Implementation

Here below, referring to FIG. 3, we present a first detailed example of a communications system using the invention, according to which the platform for the digital distribution of interactive applications 20 corresponds to a games-on-demand platform.

Figure 3:
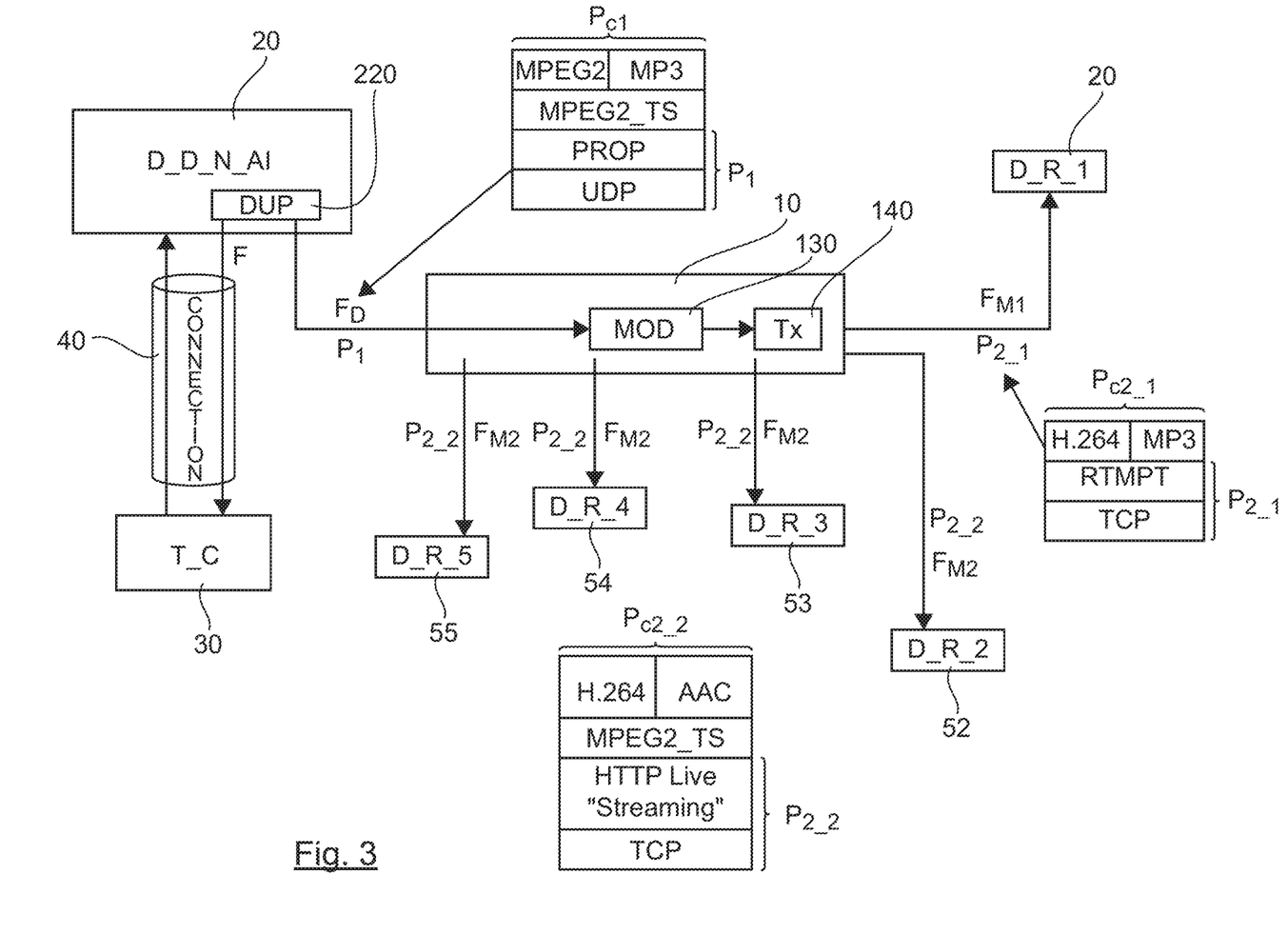
FIGS. 3 and 4 illustrate two examples of networks using the invention.

More specifically, FIG. 3 represents the implementation of the invention for the transmission of a multimedia stream corresponding to a user's games sequences of games towards rendering devices (51 to 55). Such rendering devices are distinct from a games-on-demand platform 20 and a module of a customer terminal 30, both communicating according to a first communication protocol $P_1$ via a wired (ADSL) or wireless (Wi-Fi) Internet connection 40 depending on the customer terminal.

The protocol implements for example a two-level encapsulation as illustrated here above with reference to FIG. 2.

According to the example shown in FIG. 3, the first applications protocol layer corresponds to a proprietary protocol of the platform 20 while the second transportation protocol layer corresponds to the UDP protocol.

In addition, the rendering devices (51 to 55) respectively implement a communication protocol which is specific to them, different from the communication protocols $P_1$ implemented between the games-on-demand platform 20 and the customer terminal 30. For example, in FIG. 3, the rendering device 51 (typically a specialized services platform) uses a communication protocol $P_{2\_1}$ (comprising an applications protocol layer corresponding to the RTMPT protocol, while the second transportation protocol layer corresponds to the TCP protocol), and the rendering devices 52 to 55 (for example individual viewers' terminals) use the same communication protocol $P_{2\_2}$ (comprising an applications protocol layer corresponding to the "http live streaming" protocol, while the second transportation protocol layer corresponds to the TCP protocol). However, the invention is not limited to this particular configuration.

Thus, the communications network illustrated in FIG. 3 therefore comprises at least the games-on-demand platform 20, the customer terminal 30, the intermediate device 10 implementing the method for processing multimedia streams as described here above and the distinct rendering devices 51 to 55.

Referring to FIG. 3, it can be noted that the intermediate device 10 enables the distribution of data pertaining to video games sequence directly from the games-on-demand platform 20 to a rendering device (for example the device 51) corresponding for example to a platform of specialized services such as Twitch®, UStream® or again Dailymotion®.

Thus, the multimedia stream $F_{M1}$ intended for such a specialized services platform 51 does not travel through the customer's Internet connection 40 and therefore does not come into competition with the stream F of the video game itself on this Internet connection 40, the bandwidth of which is thus preserved. In addition, the protocol and video adaptation performed at the modification step 130, automatically carried out by the intermediate device 10, is not under the responsibility of the customer terminal 30 and this places the maximum limit on the resources that this customer terminal needs to access the service and does away with the need to implement any system/method by itself.

Thus, according to a particular application, the games-on-demand platform 20 can offer its customers the possibility of broadcasting their own video games sequences live without adding constraints in terms of connectivity and capacity of their terminal and without requiring the installation of an additional system in the customer's equipment. Indeed, according to this particular application, the intermediate device 10 can be localized in proximity to the games-on-demand platform 20 or even integrated into this platform 20 while at the same time being distant from the customer terminal 30.

According to the example of FIG. 3, the games-on-demand platform 20, acting at the request of the customer (for example a video games player sending back real-time shift commands aimed at moving a character in the video stream) sends two identical streams, on the one hand the multimedia stream F to the customer terminal 30 and on the other hand a copy $F_D$ of this multimedia stream F to the intermediate device 10.

In particular, the duplicated stream $F_D$ transmitted to the intermediate device 10 is generated from the multimedia stream F by a stream duplication module 220 implemented within the games-on-demand platform 20, implemented (for example in software form) in a manner known per se by those skilled in the art.

The transmission of this duplicated stream $F_D$ from the games-on-demand platform 20 to the intermediate device 10 uses for example a unicast network connection.

Within the intermediate device 10, the duplicated stream $F_D$ compliant with the first communication protocol $P_1$ coming from the games-on-demand platform 20 is received for example by means of a Nginx-type reverse proxy server which takes position beforehand in a state of waiting for this type of stream.

Then, the duplicated stream $F_D$ compliant with the first communication protocol $P_1$ is modified (step 130) as described here above so as to obtain two distinct modified streams $F_{M1}$ and $F_{M2}$ respectively compliant with the two communication protocols $P_{2\_1}$ and $P_{2\_2}$.

More specifically, the Nginx type inverse proxy server extracts the data D_E from the duplicated stream $F_D$ by de-encapsulation of the data of the different protocol layers of the communication protocol $P_1$ implemented by the games-on-demand platform 20, such a communication protocol $P_1$ corresponding for example to the combination of an applications protocol (i.e. at the applications layer, for example a proprietary protocol of the platform 20) with a transportation protocol (i.e. at the level of the transportation layer, for example UDP or TCP).

In such a de-encapsulation the pieces of data D_E 210 are retrieved as illustrated in FIG. 2 when they have undergone several successive encapsulations. Such a de-encapsulation especially consists of the separation, within each protocol "capsule", of the data of the headers used.

Once the data has been de-encapsulated, the Nginx type inverse proxy server continues the modification step 130 for modifying the duplicated stream $F_D$ on the basis of a file or a configuration table stored by default in the intermediate device 10 or sent by the target rendering device to this intermediate device 10.

Such a file or such a table respectively contains the pieces of information $I\_P_{2\_1}$ and $I\_P_{2\_2}$ representing communication protocols $P_{2\_1}$ and $P_{2\_2}$, as described here above with reference to the method for processing multimedia streams according to one embodiment of the invention.

Such a file or such a table especially indicates the video and audio profiles to be generated at output (as a function of the target rendering device, for example RTMPT for the rendering device 51 corresponding to a specialized services platform, and HLS for the rendering devices 52 to 55 corresponding to the terminals of other users who can be qualified as "viewers" of the games sequences of the user of the customer terminal 30).

During this step 130 for modifying, the Nginx-type inverse proxy server implements for example the steps of de-multiplexing 132 (optional), or decoding 133, encoding 134 and multiplexing 135 (optional) referred to here above.

In particular, the encoding step 134 uses for example the utility program FFmpeg for the conversion of video formats, such a utility program accepting real-time encoding.

The Nginx-type inverse proxy server then triggers the (step 140) for transmitting the modified streams $F_{M1}$ and $F_{M2}$, obtained at the end of the modifying step 130, to the rendering devices 51 to 55, designated by the user of the customer terminal 30, in using the communication protocols $P_{2\_1}$ and $P_{2\_2}$ respectively used by these devices.

Thus, the operation for modifying streams carried out by the intermediate device 10 generates low latency time thus making it possible, as compared with the broadcasting of the multimedia streams F implemented by the games-on-demand platform 20, to obtain an almost real-time rendering on the rendering device 51 corresponding to a specialized services platform using an RTMP protocol.

Figure 4:
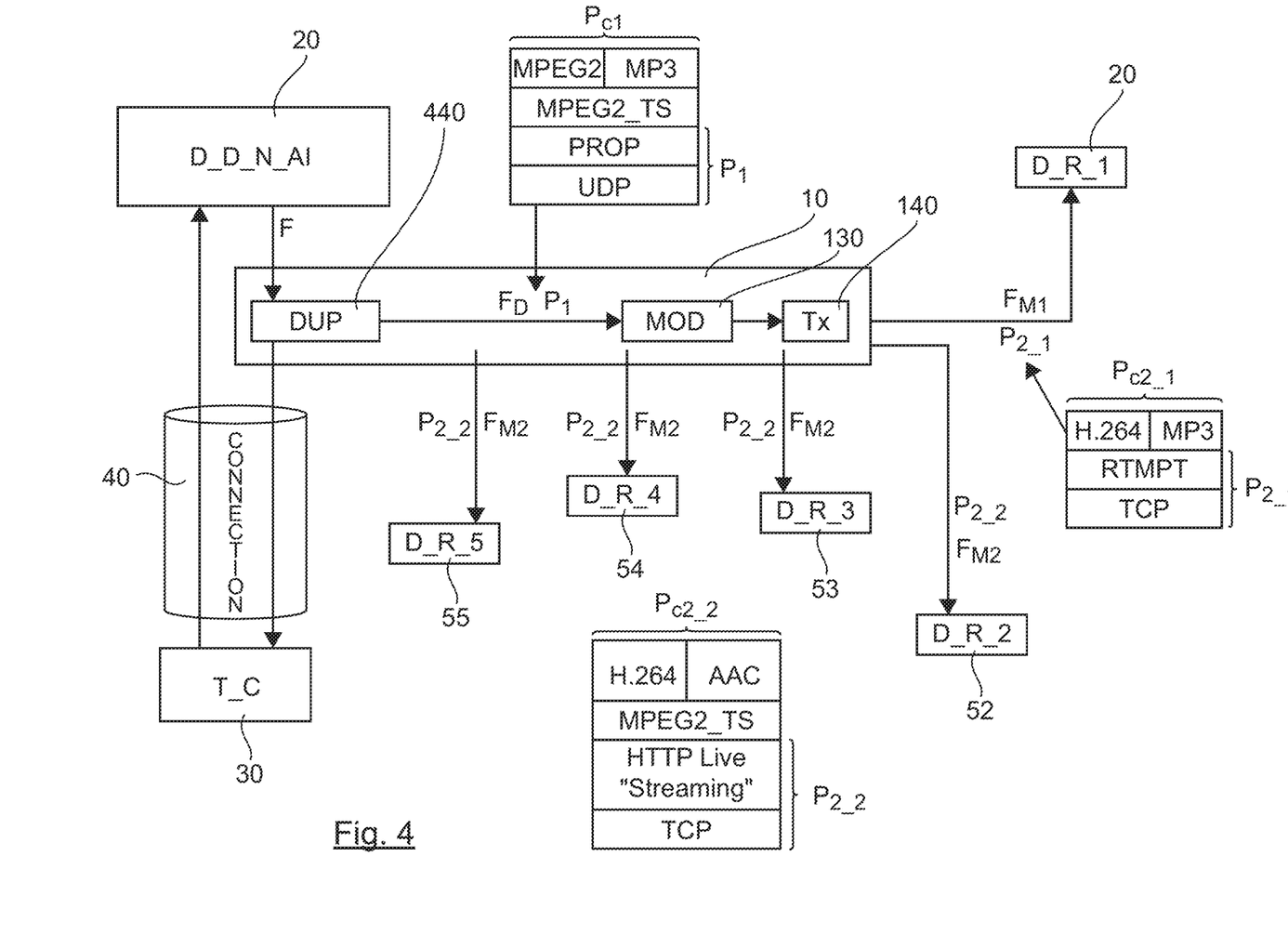

Referring to FIG. 4, we present another example of a communications network in which, unlike in the case of FIG. 3, the duplication step 120 is implemented by a duplication module 440 integrated into the intermediate device 10.

Thus, according to this example and as compared with FIG. 3, the games-on-demand platform 20 transmits a single multimedia stream F towards the customer terminal 30.

This transmission is intercepted by the intermediate device 10, the duplication module 440 of which then duplicates the multimedia stream F coming from the games-on-demand platform and then immediately re-transmits it to the customer terminal 30, and delivers a duplicated multimedia stream $F_D$ processed thereafter by means of the modification step 130 and transmission step 140 described here above with reference to FIG. 3.

5.3 Simplified Structure of a Device According to the Invention

Figure 5:
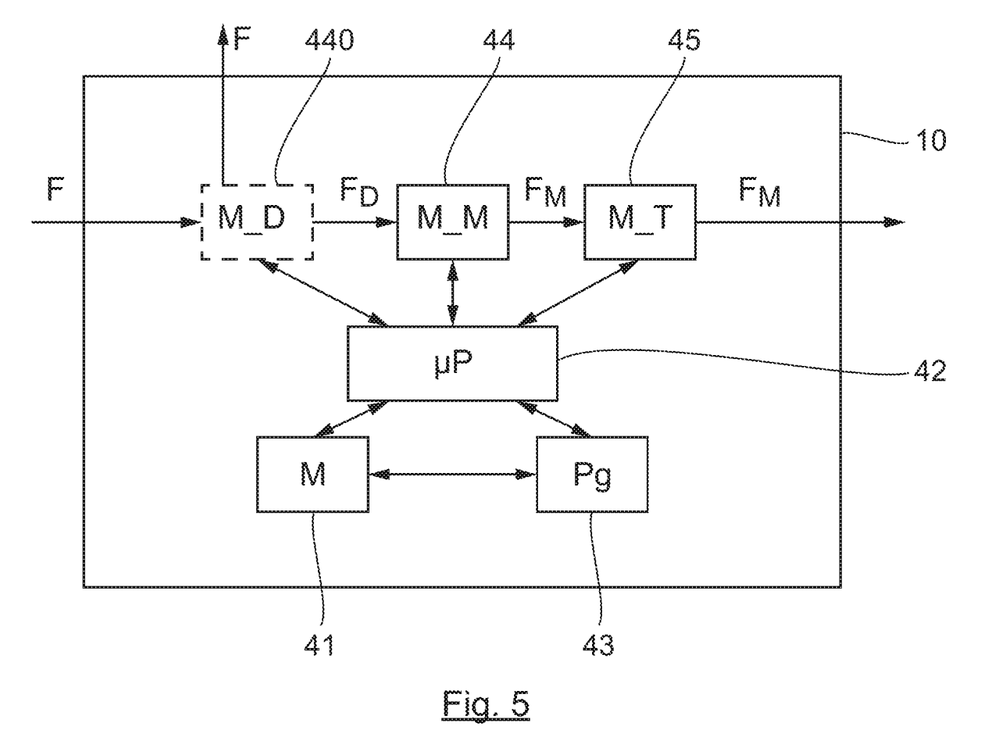
FIG. 5 presents the simplified structure of an intermediate device according to one particular embodiment of the invention.

Finally, referring to FIG. 5, we present the simplified structure of an intermediate device 10 implementing a method for processing multimedia streams according to one of the embodiments described here above.

As illustrated in FIG. 5, an intermediate device 10 according to this embodiment of the invention comprises a memory 41 (for example in the form of a buffer memory) and a processing unit 42 (equipped for example with a microprocessor μP) driven by the computer program 43 which implements the data-processing method described here above.

At initialization, the code instructions of the computer program 43 are for example loaded into a RAM of the device 10 and then executed by the processing unit 42. The processing unit 42 implements the steps of the method for processing multimedia streams described here above, according to the instructions of the computer program 43, to modify (step 130) a multimedia stream $F_D$ compliant with a first communication protocol $P_1$ implemented between a platform for the digital distribution of interactive applications 20 and a customer terminal 30, obtained from a multimedia stream F transmitted from the platform for the digital distribution of interactive applications to the customer terminal, so as to generate at least one modified multimedia stream $F_M$ compliant with at least one second communication protocol $P_2$ implemented by one (or more) target rendering devices of the network, said at least one second communication protocol being distinct from said first communication protocol and to transmit (step 140) said at least one modified multimedia stream ($F_M$) to these rendering devices by using said at least one second communication protocol ($P_2$).

To this end, the intermediate device 10 comprises, in addition to the memory 41 and the processing unit 42:
- a module 44 for modifying a multimedia stream ($F_D$) compliant with the first communication protocol ($P_1$), obtained from a multimedia stream (F) transmitted from the platform for the digital distribution of interactive applications to the customer terminal, generating at least one modified multimedia stream ($F_M$) compliant with at least one second communication protocol ($P_2$), said at least one second communication protocol being distinct from said first communication protocol,
- a module (45) for transmission of said at least one modified multimedia stream ($F_M$) to at least one rendering device (51) in using said at least one second communication protocol ($P_2$).

Moreover, optionally (shown in dashes) the intermediate device 10 furthermore comprises a duplication module (440), for the duplication of the multimedia stream (F) transmitted to the customer terminal, delivering said multimedia stream compliant with the first communication protocol ($P_1$), called a duplicated multimedia stream ($F_D$), said duplication module (440) receiving said multimedia stream (F) transmitted to the customer terminal by said platform (20) for digital distribution of interactive applications, and re-transmitting, after duplication, said multimedia stream (F) to said customer terminal, These different modules 440, 44 and 45 can be components driven by the processing unit 42, possibly implemented in software form.

The invention claimed is:

1. A method comprising:
   processing multimedia streams between a platform for digital distribution of interactive applications corresponding to a game-on-demand platform, and a customer terminal, connected through a communications network and communicating with each other according to a first communication protocol, wherein processing the multimedia streams comprises the following acts implemented by an intermediate device distinct from the customer terminal:

modifying a multimedia stream compliant with the first communication protocol, corresponding to a user's sequences of an interactive application, said user's sequences of an interactive application corresponding to user's video game sequences, said user's sequences being generated by said platform for digital distribution of interactive applications following an action by the user in a video game, and obtained from a multimedia stream transmitted from the platform for the digital distribution of interactive applications to the customer terminal, the modifying resulting in at least one modified multimedia stream compliant with at least one second communication protocol, said at least one second communication protocol being distinct from said first communication protocol, transmitting said at least one modified multimedia stream to at least one rendering device, which is distinct from the customer terminal, using said at least one second communication protocol.

2. The method according to claim 1, wherein the method comprises duplication, by the platform for the digital distribution of interactive applications, of said multimedia stream transmitted to the customer terminal, delivering said multimedia stream compliant with the first communication protocol, called a duplicated multimedia stream, said duplicated multimedia stream being transmitted from the platform for the digital distribution of interactive applications to the intermediate device.

3. The method according to claim 1, wherein the method comprises duplication, by the intermediate device, of the multimedia stream transmitted to the customer terminal, delivering said multimedia stream compliant with the first communication protocol, called a duplicated multimedia stream, the multimedia stream being received by the intermediate device coming from the platform for the digital distribution of interactive applications and then being re-transmitted to the customer terminal.

4. The method according to claim 1, wherein the method comprises a preliminary act of receiving a piece of information representing an authorization of duplication of said multimedia stream transmitted to the customer terminal, sent by an entity belonging to the group comprising:

said customer terminal,
said platform for the digital distribution of interactive applications,
a provider of access to said communications network.

5. The method according to claim 1, wherein modifying comprises at least one act of memorizing a piece of information representing said at least one second communication protocol.

6. The method according to claim 1, wherein modifying comprises de-encapsulating said multimedia stream compliant with the first communication protocol delivering de-encapsulated data packets and encapsulation according to said at least one second communication protocol, said at least one modified multimedia stream being generated from said encapsulation of said de-encapsulated data packets.

7. The method according to claim 6, wherein modifying furthermore comprises decoding packets of de-encapsulated data according to a first encoding format, delivering decoded data, and encoding said decoded data, according to a second encoding format distinct from the first encoding format, delivering encoded data to be encapsulated during said encapsulation.

8. The method according to claim 7, wherein modifying furthermore comprises de-multiplexing the packets of de-encapsulated data, delivering de-multiplexed data to be decoded during the decoding and/or multiplexing the data encoded according to the second encoding format delivering the multiplexed data that is to be encapsulated during the encapsulation.

9. An intermediate device for processing multimedia streams capable of being used between a platform for digital distribution of interactive applications corresponding to a game-on-demand platform, and a customer terminal connected through a communications network and communicating with each other according to a first communication protocol, wherein said intermediate device comprises:

a memory and a processing unit configured to modify a multimedia stream compliant with the first communication protocol, corresponding to a user's sequences of an interactive application, said user's sequences of an interactive application corresponding to user's video game sequences, said user's sequences being generated by said platform for digital distribution of interactive applications following an action by the user in a video game, and obtained from a multimedia stream transmitted from the platform for the digital distribution of interactive applications to the customer terminal, the modifying resulting in at least one modified multimedia stream compliant with at least one second communication protocol, said at least one second communication protocol being distinct from said first communication protocol; and a transmitter, which transmits said at least one modified multimedia stream to at least one rendering device, which is distinct from the customer terminal, using said at least one second communication protocol.

10. The intermediate device for processing multimedia streams according to claim 9, wherein the memory and processor are further configured to duplicate the multimedia stream transmitted to the customer terminal, delivering said multimedia stream compliant with the first communication protocol called a duplicated multimedia stream, said intermediate device receiving said multimedia stream transmitted to the customer terminal by said platform for the digital distribution of interactive applications, and re-transmitting, after duplication, said multimedia stream to said customer terminal.

11. A system for processing multimedia streams comprising:

a platform, which digitally distributes interactive applications, corresponding to a game-on-demand platform;

a customer terminal, connected through a communications network and communicating with the platform according to a first communication protocol, said platform transmitting a multimedia stream compliant with said first protocol to said customer terminal, said multimedia stream corresponding to a user's sequences of an interactive application distributed by said platform, said user's sequences corresponding to user's video game sequences, said user's sequences being generated by said platform following an action by the user in a video game, said platform being configured to duplicate said multimedia stream transmitted by said platform to the customer terminal, delivering a duplicate multimedia stream compliant with the first communication protocol, and transmit the duplicate multimedia stream to an intermediate device; and the intermediate device, which is configured to modify the multimedia stream compliant with the first communication protocol, obtained from the platform, the modifying resulting in at least one modified multimedia stream compliant with at least one second communication protocol, said at least one second communication protocol being distinct from said first communication protocol, and the intermediate device comprising a transmitter, which transmits said at least one modified multimedia stream to at least one rendering device, which is distinct from the customer terminal, using said at least one second communication protocol.

12. A non-transitory computer-readable medium comprising a computer program comprising program code instructions stored thereon to execute a method for processing multimedia streams, when the program is executed by a computer or a processor of an intermediate device, wherein the method comprises:

processing the multimedia streams between a platform for digital distribution of interactive applications corresponding to a game-on-demand platform, and a customer terminal, which are connected through a communications network and communicate with each other according to a first communication protocol, wherein processing the multimedia streams comprises the following acts implemented by the intermediate device, which is distinct from the customer terminal:

modifying a multimedia stream compliant with the first communication protocol, corresponding to a user's sequences of an interactive application, said user's sequences of an interactive application corresponding to user's video game sequences, said user's sequences being generated by said platform for digital distribution of interactive applications following an action by the user in a video game, and obtained from a multimedia stream transmitted from the platform for the digital distribution of interactive applications to the customer terminal, the modifying resulting in at least one modified multimedia stream compliant with at least one second communication protocol, said at least one second communication protocol being distinct from said first communication protocol, transmitting said at least one modified multimedia stream to at least one rendering device, which is distinct from the customer terminal, using said at least one second communication protocol.

* * * * *